United States Patent [19]

Ballard et al.

[11] Patent Number: 4,946,096

[45] Date of Patent: Aug. 7, 1990

[54] METHOD AND APPARATUS FOR OPERATING A FURNACE FROM A 12V DC BATTERY

[75] Inventors: Gary W. Ballard, Plainfield; Kevin D. Thompson, Indianapolis, both of Ind.

[73] Assignee: Carrier Corporation, Syracuse, N.Y.

[21] Appl. No.: 448,414

[22] Filed: Dec. 11, 1989

[51] Int. Cl.⁵ .................................................. F23N 5/00
[52] U.S. Cl. .......................................... 236/11; 307/66
[58] Field of Search .............. 236/11, 10, 94; 307/64, 307/66, 67, 68

[56] References Cited

U.S. PATENT DOCUMENTS

| | | | |
|---|---|---|---|
| 4,349,148 | 9/1982 | Liberto et al. | 236/11 |
| 4,400,626 | 8/1983 | Lacy | 307/66 |
| 4,638,942 | 1/1987 | Ballard et al. | 236/10 |
| 4,673,826 | 6/1987 | Masson | 307/66 |
| 4,729,207 | 3/1988 | Dempsey et al. | 431/12 |
| 4,797,567 | 1/1989 | Pappas | 307/66 |

*Primary Examiner*—Harry B. Tanner
*Attorney, Agent, or Firm*—Dana F. Bigelow

[57] ABSTRACT

A furnace which normally operates from a residential AC power source is adapted to operate on auxiliary DC power by changing the normal control function to substantially prevent the furnace from operating in the high heat mode during periods of auxiliary power use. Relays can be used to automatically connect the emergency power and to effect the change of the control function.

14 Claims, 2 Drawing Sheets

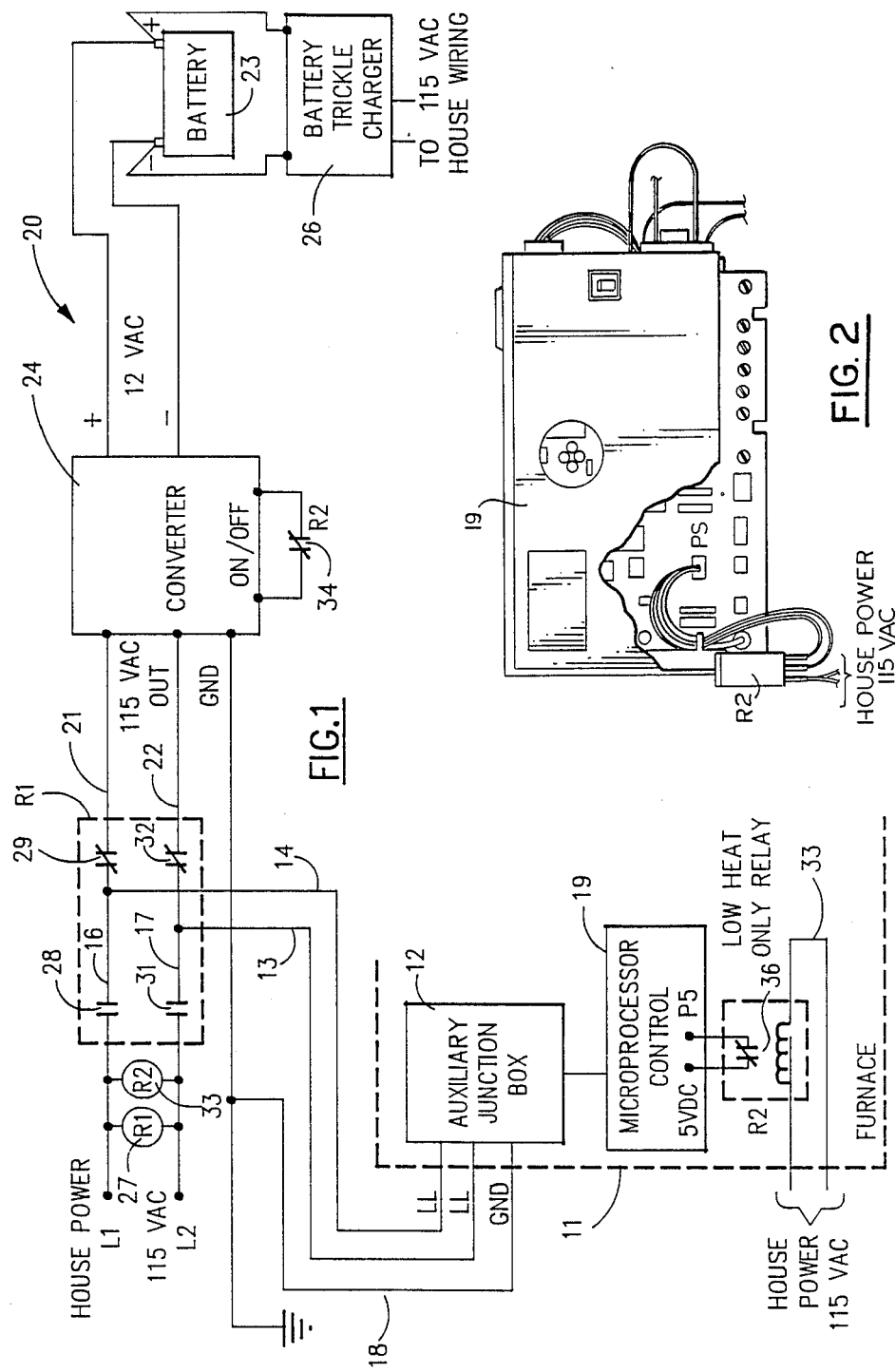

METHOD AND APPARATUS FOR OPERATING A FURNACE FROM A 12V DC BATTERY

BACKGROUND OF THE INVENTION

This invention relates generally to residential furnaces and, more particularly, to a method and apparatus for temporarily operating a furnace from an auxiliary power source.

The primary energy source for most residential furnaces is a fossil fuel such as gas or oil. However, electrical power is also used in such furnaces in order to provide power for the control systems and for the auxiliary equipment such as blowers and the like. Thus, if electrical power to a home is interrupted such as sometimes occurs during ice storms and the like, a home may be left without heat for hours or even days at a time. On these occasions, it would be desirable to operate the furnace on an emergency power basis.

The usual types of auxiliary power used for emergency purposes include small internal combustion engine driven emergency power generators, or a bank of 12V DC batteries operating through a DC/AC power converter. In neither case would there be sufficient power over the necessary time in order to sustain continued operation of the standard furnace. The primary reason is that a standard furnace will draw too much power, such that the auxiliary source cannot maintain continued operation thereof over a prolonged period of time.

Conventional furnaces with 60,000 BTU heating output generally consume 500–800 watts of electrical power when operating. If a 12V DC battery is used to provide this power through a power converter, the furnace would draw 40–67 amps from the battery. Such a high current would drain a single marine battery very quickly. Accordingly, it would be necessary to use several batteries in parallel in order to deliver the necessary current over a reasonable operating time.

Considering now the possibility of operating the furnace with a standard 100–200 watt power converter powered from an automobile battery, if the automobile engine is allowed to idle at 500–600 rpm, the alternator will produce only about 10–20 amps. In order for the alternator to deliver the required current for proper operation of the furnace, it would be necessary to increase the engine speed to 2,000 rpms, which in turn would require someone to sit in the car and hold the throttle pedal down or to readjust the idle screw on the carburetor. Similarly, in the case of a small emergency generator driven by an internal combustion engine, it would be necessary to have a substantially large generator or a substantially large internal combustion engine in order to obtain the desired current level to sustain operation of the furnace.

It is now common practice to provide dual rate burners in furnaces such that they can operate in either the low or the high heat mode depending on the heating load. In addition to the draft inducer motor operating in the low and high speed modes, the air circulation blower is also selectively run at either low or high speeds, corresponding to the respective low or high mode of the burner. While the ambient temperature conditions and the character of the space to be heated will determine the relative mix of high and low fire operation, there will normally be some time periods in which the system will be caused to operate in a high fire mode. When the ambient conditions are such that power failures are caused to occur (e.g., ice storms), then the likelihood of operating in a high fire mode increases. It is this mode, and in particular the circulation blower, that tends to draw more current and to thereby overload the auxiliary power system as discussed hereinabove. That is, the applicants have recognized that the power draw of the circulation blower motor operating in the high heat mode is on the order of six times that for the same motor operating in the low heat mode.

One of the times when the furnace normally operates its circulation blower in a high speed mode is when there is a temporary power loss followed by a recovery of power immediately thereafter. If the system had been operating at the time, there would still be a call for heat but the heat exchanger would still be hot. In this situation, in order to prevent the tripping of the limit switch because of the heat exchanger becoming too hot upon resumption of the heating cycle, the circulation blower is normally caused to be automatically turned on at high speed in order to cool off the heat exchanger and thereby avoid the tripping of the limit switch. This occurrence would, of course, tend to draw down the current of any auxiliary power source that may be brought on line after a power interruption.

It is therefore an object of the present invention to provide an improved method and apparatus for operating a furnace from an auxiliary power source.

Another object of the present invention is the provision for operating a furnace from an auxiliary power source without drawing excessive current from the source.

Yet another object of the present invention is the provision in a dual rate furnace for operating for prolonged periods with an auxiliary power source.

Still another object of the present invention is the provision for temporarily operating a furnace from an auxiliary power source in an effective and economical manner.

These objects and advantages become more readily apparent upon reference to the following description when taken in conjunction with the appended drawings.

SUMMARY OF THE INVENTION

Briefly, in accordance with one aspect of the invention, when an interruption in the main electrical power supply to a furnace is sensed, an auxiliary power source is connected to the circuit and the furnace is then substantially inhibited from operating in the high heat mode. In this way, the furnace will operate in a low heat mode to provide a large percentage of its normal heating output while drawing only a small percentage of its normal power consumption, such that the auxiliary power is not depleted over prolonged periods of operation.

By another aspect of the invention, a microprocessor controlled furnace has a function incorporated therein which, when the microprocessor receives an indication that the normal flow of power to the system has been interrupted, will then restrict the furnace from operating in the high fire mode and will allow only operation in the low fire mode.

By yet another aspect of the invention, relays are installed in the system such that when the normal source of power is interrupted, a first relay is activated to automatically connect an auxiliary power system to the line leading to the furnace, and a second relay is automatically activated to provide an indication to the microprocessor that it should then function to restrict the furnace from operating in the high fire mode.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a schematic illustration of the present invention as installed in the electrical circuitry of a typical residential furnace.

FIG. 2 is a front view of the microprocessor control box with a portion broken away to show the low heat only relay portion thereof.

DESCRIPTION OF THE PREFERRED EMBODIMENT

Figure 3:
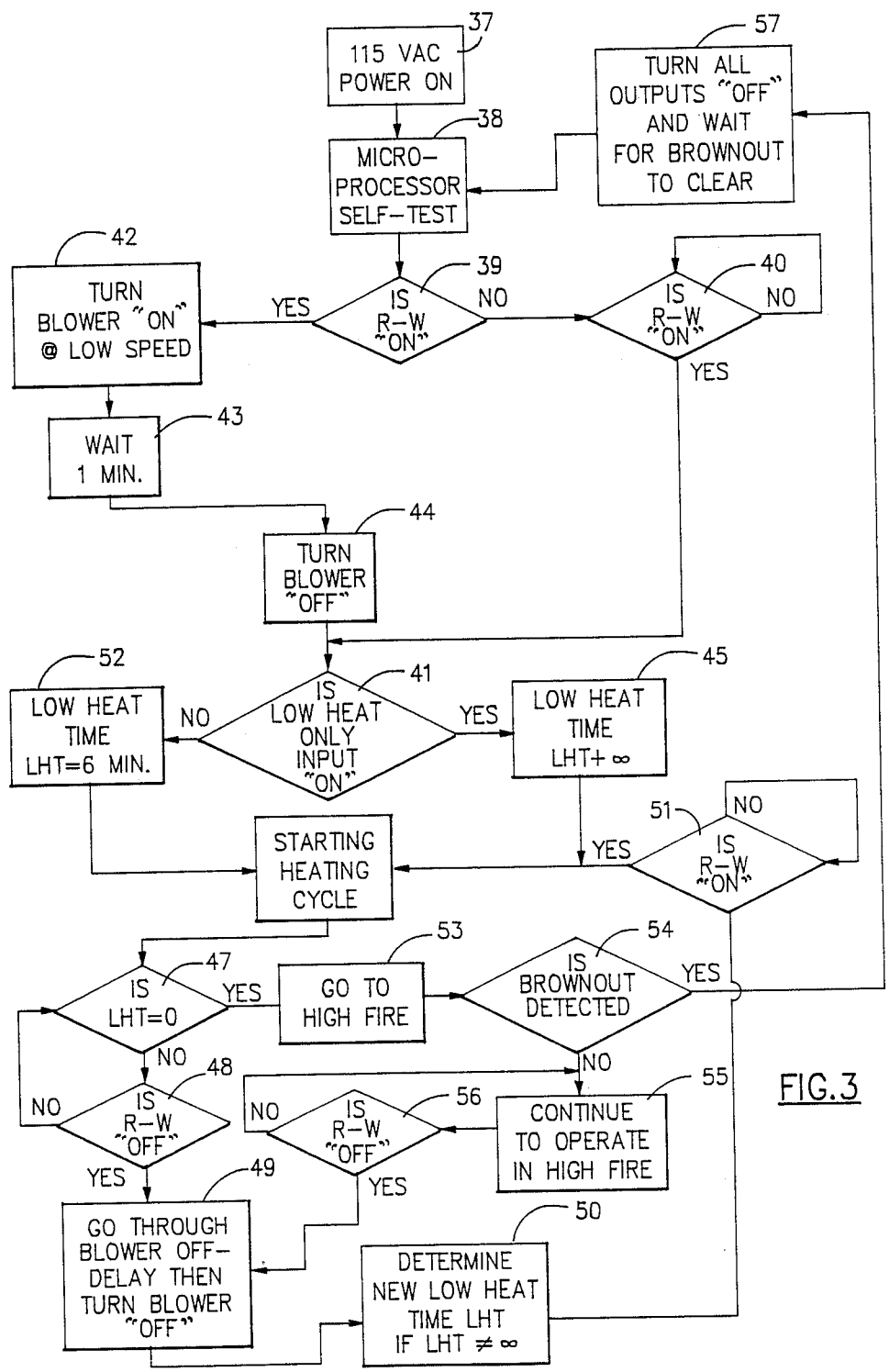
FIG. 3 is a representative flow chart of a computer program for implementing the present invention.

Referring now to FIG. 1, there is shown a furnace 11 which is powered in a normal manner by way of a 115V AC power source connected across terminals L1 and L2. The power is connected to the furnace auxiliary junction box 12 by way of lines 13 and 14, which are, in turn, connected to main power lines 16 and 17, respectively. The furnace is grounded by way of ground wire 18.

Included in the furnace 11 is a microprocessor control box 19 which is shown pictorially in FIG. 2 and in schematic form in FIG. 1. The microprocessor control 19 functions to control the operation of the various components within the furnace 11 in the manner set forth in U.S. Pat. Nos. 4,638,942 issued on Jan. 27, 1987 and 4,729,207 issued on Mar. 8, 1988, both of which are assigned to the assignee of the present invention. Those patents are incorporated herein by reference.

Connected to the main power lines 16 and 17 is an auxiliary or emergency power circuit 20 which includes auxiliary lines 21 and 22, and a 12V DC battery 23. Preferably, the battery 23 is of the marine type for delivering lower constant amps at 12V potential for a relatively long period of time. A standard 100 watt power converter 24, such as the commercially available type with the brand name "Triplitte", is provided to convert the 12V DC current to 115V AC current. A battery trickle charger 26 is preferably connected to the terminals of the battery 23, such that during periods when the battery 23 is not being used (i.e., when normal power is being delivered at the terminals L1 and L2), the charger 26 will restore any charge to the battery 23 that has been depleted during periods of power off conditions. As an alternative an automobile battery can be connected to the converter 24 in the same manner, with the battery being charged from the alternator of the automobile.

In order to provide for automatic connection of auxiliary circuit 20 with the loss of power to terminals L1 and L2, a relay R1 is provided in the circuit to include a relay coil connected across main lines 16 and 17, relay contacts 28 and 29 in lines 16 and 21, respectively, and relay contacts 31 and 32 in lines 17 and 22, respectively. The relay contacts 28 and 31 are of the normally open type and the relay contacts 29 and 32 are of the normally closed type such that when normal power exists across terminals L1, L2, the coil R1 causes the contacts 28 and 31 to be closed to deliver normal power to the auxiliary junction box 12, while when there is a loss of power to terminals L1, L2, the contacts 28 and 31 are open and contacts 29 and 32 are closed to connect the auxiliary power circuit 20 to the auxiliary junction box 12.

When the auxiliary power circuit 20 is brought on line, it is desirable that the furnace 11 operates in a different manner than when in normal mode so as to minimize the current draw from the battery 23 while at the same time ensuring that a reasonable amount of heat is provided by the furnace 11. The changes in operation will be described hereinafter with respect to the steps shown in FIG. 3.

The way in which certain portions of the changes are made will now be described with respect to the preferred embodiment of FIG. 1. Here a second relay R2 is provided to automatically change certain aspects relating to the manner in which the furnace 11 operates during emergency power conditions. The relay R2 comprises a coil 33 connected across main lines 16 and 17, and normally open contacts 34 and 36 as shown in FIG. 1. The normally open contacts 34 are therefore open during normal power conditions to maintain the power converter 24 in the off condition but are closed by the coil 33 when normal power is lost to thereby turn on the converter 24.

With the dropout of the relay coil 33, the normally open contacts 36 are closed to apply a potential of 5 V DC across the terminals P5 of the microprocessor 19 to thereby initiate the "low heat only" function as a modification to the normal operation of the furnace 11.

The actual connection of the relay R2 to the terminals P5 of the microprocessor 19 is shown in FIG. 2 as a way in which existing hardware can be modified to obtain the advantage of the present invention. This function could be obtained in other forms such as with a manually operated switch or a built in feature of the microprocessor 19.

The manner in which the "low heat only" function operates to change the normal operation of the furnace is shown in the flow chart of FIG. 3. In block 37, the microprocessor 19 responds to the existence of the 115V AC power supply which, in the present case would be coming from the power converter 24 in the emergency power conditions. The microprocessor goes through a self test operation in block 38 and then responds to the thermostat at block 39. If there is not a call for heat, it proceeds to block 40 and remains in that mode until there is a call for heat, after which it passes to block 41. If, at block 39, there is an immediate call for heat, as would be the case when the furnace was operating when power was lost, the blower would be turned on at low speed at block 42. This is a first change that is made to the normal sequence to accommodate an emergency power condition, since normally the fan would be turned on at high speed at this time, thereby causing a high discharge of power from the battery 26. After one minute of operation as indicated by block 43, the blower would be turned off at block 44. This one minute sequence is applied in order to cool off the heat exchanger to prevent the tripping of a limit switch because of the temperature of the heat exchanger becoming excessive.

At block 41 the microprocessor queries as to whether the "low heat only" function is activated. If it is activated, as would be indicated by the 5V potential being applied to the terminals P5 of the microprocessor, then the sequence would move to block 45 wherein the low heat time (LHT) would be set at infinity. In this mode, the furnace will be entirely prevented from operating in the high heat mode and as such will be prevented from the associated high current draw that would otherwise occur to deplete the power of the battery 23. While in this mode, the furnace will deliver approximately 67% of its normal heating output while consuming only 20% of its normal electrical power. That is, it will draw only 6.5 to 9.0 amps at 12V DC to consume 80–100 watts, which can be provided by the auxiliary power circuit 20 that is shown in FIG. 1. Alternatively, a small emergency power generator may be used to provide the emergency power, or the power may be obtained from an automobile battery with the automobile engine running at idle to allow the alternator to maintain the battery charge.

Having established no limit for the time of low heat (i.e., "low heat only"), the heating cycle is started at block 46 and the sequence passes through blocks 47 and 48 until such time as the heating demand is met. The sequence then passes to block 49 wherein the blower is turned off after a prescribed one minute delay. A new low heat time LHT is then determined at block 50 as a function of various operating parameters such as previous cycle time, etc. In the case where the LHT has been set at infinity as described, the LHT will remain at that value. The sequence then passes to block 51 wherein the system responds to the thermostat to again start the heating cycle at block 46 when a call for heat is initiated. The "low heat only" function will remain active to keep the function of block 45 in the system such that in all cycles to follow, the system will be entirely prevented from operating in the high heat mode.

While the "low heat only" function, as initiated by the relay R2, is the preferred mode since the system is then entirely precluded from operation in the high heat mode provision is made to alternatively restrict the operation of the system from operation in the high fire mode in another manner. In this alternative manner of operation, the system is restricted to low heat operation for a period of time and will then be allowed to temporarily, but for a very short period of time such as a few microseconds, be allowed to operate in the high fire mode before going to a reset operation where it again cycles through the period of low heat operation. This is shown in the remaining portion of the flow chart of FIG. 3 which will now be described.

If a "low heat only" function is not activated as would be indicated at the left side of block 41, the low heat time (LHT) is set at six minutes in block 52 and the heating cycle is initiated in block 46. If the demand of the thermostat is met within the first six minutes of operation, the system cycle will then pass through the steps of blocks 47–51 and, at the next call for heat, the heating cycle will again be initiated with the new low heat time (LHT) being set at a finite period in block 50. If the heating demand is not met after the new low heat time has expired, then the sequence will pass from block 47 to block 53 wherein the high fire mode of operation is initiated.

At block 54, a brownout detection function is initiated. When this occurs the increased current drain is beyond the capability of the battery 23 and the charging system 26, thus causing the battery voltage to drop low enough that the microprocessor brownout circuit shuts down the furnace. The purpose of this function is to protect against a low input voltage condition such as may occur when the power demand on the utility company becomes excessive, for example. Thus, with an established threshold voltage of 18 volts AC, for example, the brownout detector would respond positively to voltages below 18 V AC to reset the system as indicated at block 57. Accordingly, while the system would for a very short period of time be operating to initiate a high fire condition at block 53, it would be substantially prevented from operating in that mode. A few minutes later after the battery voltage has climbed back to the normal level, the system will operate in a low heat mode for a maximum of six minutes before passing to block 53 where that cycle would then again be initiated.

When the system is operating in its normal mode with 115V AC house power, the brownout detection function responds negatively at block 54, and the system continues to operate in high fire mode until the heat demand is met as indicated by blocks 55 and 56, after which the sequence then processes through the events as indicated in blocks 49–51 as discussed hereinabove.

It will be recognized from the foregoing description that, while the "low heat only" function as brought into play by the relay R2 is a desirable feature, it is optional in the present invention. That is, the process shown in FIG. 3 and described hereinabove accomplishes the basic function of restricting the furnace from high heat mode of operation to thereby prevent the drain of power from the auxiliary power system. This is accomplished first at block 42 wherein the blower is limited to a low speed rather than the conventional high speed operation, and later at block 54 wherein the system is prevented from any sustained operation in the high heat mode.

While the present invention has been disclosed with particular reference to a preferred embodiment, the concepts of this invention are readily adaptable to other embodiments, and those skilled in the art may vary the structure thereof without departing from the essential spirit of the present invention. For example, while the invention has been described in terms of use with relays R1 and R2 to automatically bring in the auxiliary power and introduce the "low heat only" function, it will be recognized that the relays R1 and R2 may be replaced with manual switches which can be actuated by an operator to bring in these functional features.

What is claimed is:

1. A method of operating on auxiliary power, a furnace of the type for use with an electrical power source that is susceptible to interruption and having blower and burner assemblies with each having high and low heat capabilities comprising the steps of:
    sensing when power from the electric power source has been interrupted;
    connecting an auxiliary source of power to the furnace when said interruption is sensed; and
    substantially inhibiting the blower from operating in a high heat mode during the period of time in which the furnace is operating with auxiliary power.

2. A method of operating a furnace as set forth in claim 1 wherein said auxiliary power source includes a DC battery.

3. A method of operating a furnace as set forth in claim 2 wherein said auxiliary power source further includes a DC-AC converter.

4. A method of operating a furnace as set forth in claim 1 wherein said sensing and connecting steps are accomplished by way of a relay.

5. A method of operating a furnace as set forth in claim 1 wherein said inhibiting step is accomplished by way of responsively initiating a control function that entirely prevents the system from operating in the high heat mode.

6. A method of operating a furnace as set forth in claim 5 wherein said inhibiting step is initiated by way of a relay.

7. An improved furnace of the type which is operable with an electric power source that is susceptible to interruption and having blower and burner assemblies with each having high and low heat capabilities comprising:
  means for sensing when the power from the electric power source is interrupted;
  means for connecting an auxiliary power source to the furnace when said interruption is sensed; and
  means for substantially inhibiting the furnace from operating in a high heat mode during the period of time in which the furnace is operating with auxiliary power.

8. An improved furnace as set forth in claim 7 wherein said sensing and connecting means comprises a relay.

9. An improved furnace as set forth in claim 7 wherein said auxiliary power source includes a DC battery and a power converter.

10. An improved furnace as set forth in claim 7 wherein said means for substantially inhibiting the furnace from operating in a high heat mode comprises a control function for entirely limiting the operation of the furnace to a low heat mode.

11. A method of operating a furnace of the type having both high and low heat modes of operational capability, with associated high and low levels for a blower motor normally powered by an AC power source, comprising the steps of:
  sensing when the power from the AC power source has been interrupted;
  responsively connecting an auxiliary power source to the furnace to provide power to its auxiliary equipment including the blower motor; and
  substantially restricting the blower motor from high speed operation when operating on auxiliary power.

12. A method of operating a furnace as set forth in claim 11 wherein said sensing and connecting steps are accomplished by way of a relay.

13. A method of operating a furnace as set forth in claim 11 wherein said auxiliary power source comprises a battery and a converter.

14. A method of operating a furnace as set forth in claim 11 wherein said restricting step is accomplished by limiting the operational capability of the blower to the low speed only.

* * * * *